Figure 1:
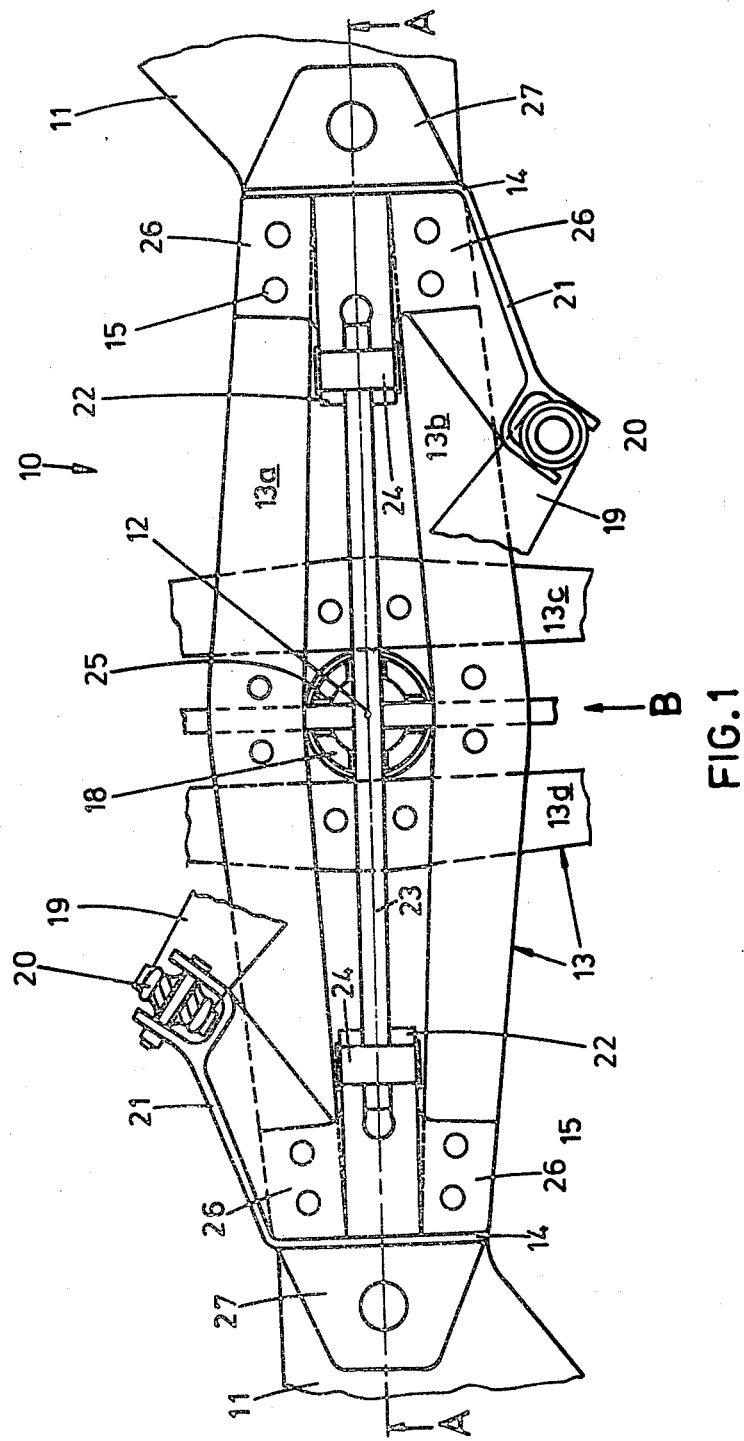

United States Patent [19]
Watson

[11] 4,307,996
[45] Dec. 29, 1981

[54] HELICOPTER ROTORS
[75] Inventor: Kenneth Watson, Yeovil, England
[73] Assignee: Westland Aircraft Limited, Yeovil, England
[21] Appl. No.: 92,180
[22] Filed: Nov. 7, 1979
[30] Foreign Application Priority Data
Nov. 16, 1978 [GB] United Kingdom ............... 44721/78
[51] Int. Cl.³ ............................................. B64C 27/40
[52] U.S. Cl. ................................... 416/141; 416/138
[58] Field of Search .......... 416/134 A, 138 A, 140 A, 416/141

[56] References Cited
U.S. PATENT DOCUMENTS

| 4,008,980 | 2/1977 | Noehren et al. | 416/134 A |
| 4,111,605 | 9/1978 | Roman et al. | 416/138 A X |
| 4,182,597 | 1/1980 | Derschmidt | 416/141 X |
| 4,201,515 | 5/1980 | Derschmidt et al. | 416/141 X |
| 4,251,188 | 2/1981 | Schwarz et al. | 416/138 A X |

FOREIGN PATENT DOCUMENTS

| 2753305 | 5/1979 | Fed. Rep. of Germany | 416/138 A |
| 2804386 | 8/1979 | Fed. Rep. of Germany | 416/102 |
| 642206 | 7/1962 | Italy | 416/102 |
| 752220 | 7/1956 | United Kingdom | 416/138 A |
| 751109 | 6/1958 | United Kingdom | 416/102 |
| 1189136 | 4/1970 | United Kingdom | 416/138 A |

Primary Examiner—Everette A. Powell, Jr.
Attorney, Agent, or Firm—Larson and Taylor

[57] ABSTRACT

A helicopter rotor has at least one pair of diametrically opposed rotor blades interconnected by a strap member flexible in torsion and in a plane perpendicular to a plane of rotation and stiff in a plane coincident with the plane of rotation. A torsionally flexible tie-bar having a tensile elastic modulus greater than that of the strap member is extended between pivotal attachments adjacent opposed ends of the interconnecting strap member.

In operation, a major portion of centrifugal loads caused by the rotating blades is carried by the tie-bar.

10 Claims, 3 Drawing Figures

HELICOPTER ROTORS

This invention relates to helicopter rotors and particularly to an anti-torque or tail rotor for a helicopter.

Tail rotors usually comprise one or more pairs of diametrically opposed rotor blades and it has been proposed that such pairs of blades should be cross-connected by flexure means comprising a strap that may be formed either integrally with the respective rotor blades or as a separate member to the ends of which are attached the respective blades. The strap, which may be of any suitable material, including fibre-reinforced plastics, is usually flattened in the plane of rotation of the rotor to transmit the driving torque, and is flexible in torsion and in a plane perpendicular to the plane of rotation of the rotor so as to permit pitch changes of the blades and the attendant flapping and coning movement thereof.

Prior examples of this type of rotor are described and illustrated in British Patent Specification No. 1,476,462 and U.S. Pat. No. 4,008,980 and such rotors have become known in the art as cross-beam or strapped rotors.

It will be noted that, in these prior rotors, the cross-connecting strap members are required to transmit centrifugal loads generated by the rotating blades, and this has constituted a predominant consideration in the design of the strap members.

Accordingly, the present invention provides a helicopter rotor having a pair of diametrically opposed rotor blades arranged for rotation about an axis, and interconnected by a strap member which is flexible in torsion and in a plane perpendicular to the plane of rotation and substantially stiff in the plane of rotation, and a torsionally flexible tie bar, having a tensile elastic modulus greater than that of the strap member, extending between pivotal attachments adjacent to opposed ends of the strap member and that permit relative pivotal movements in a plane perpendicular to said plane of rotation.

The strap member may comprise two spaced-apart generally parallel arms located one on each side of the axis of rotation and in a plane coincident with the plane of rotation of the rotor. The arms may be of flattened configuration in the plane of rotation.

Preferably, the tie bar is located centrally within the spaced-apart arms of the strap member so as to lie through the axis of rotation. Conveniently, adjacent ends of the strap members may be interconnected by a fitting having an integral inwardly facing jaw portion providing the pivotal attachment for the ends of the tie bar. The fitting may have an integral outwardly facing jaw portion adapted for attachment of its respective rotor blade.

A central region of each of the spaced-apart arms may be attached to diametrically opposed flanges formed on an axially extending tubular rotor drive shaft. Conveniently, an axially movable tubular rotor control shaft may be located concentrically through the drive shaft and may protrude through the spaced-apart arms of the strap member to terminate at an outer end supporting radially extending blade pitch control arms equal in number to the number of rotor blades and operably associated therewith. The rotor control shaft may have axially extending slots for the passage of the tie bar.

The strap member may be constructed of fibre reinforced plastics material, and the tie bar may be constructed of steel.

Figure 2:
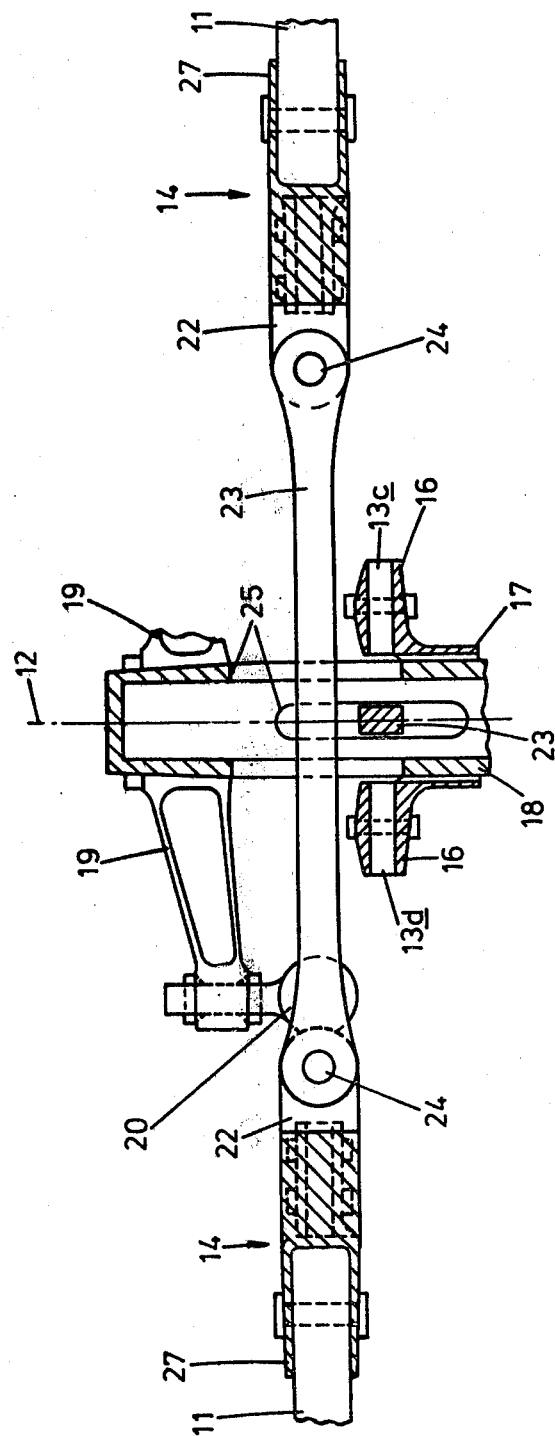
Figure 3:
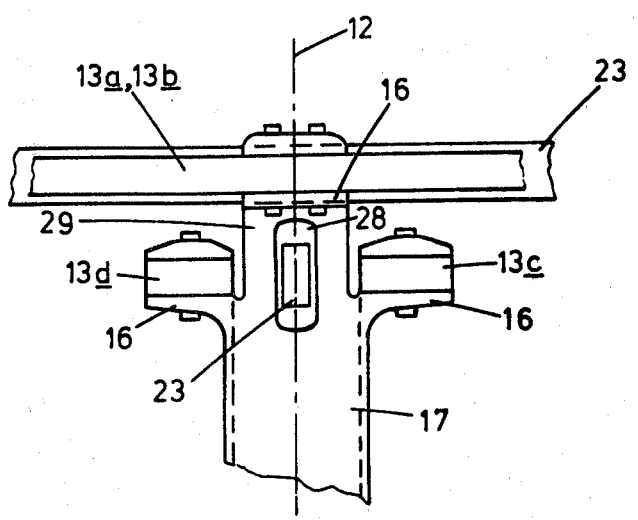

The invention will now be described by way of example only and with reference to the accompanying drawings in which:

FIG. 1 is a fragmentary plan view of a helicopter rotor constructed in accordance with one embodiment, FIG. 2 is a fragmentary sectioned view taken along lines A—A of FIG. 1, and FIG. 3 is a fragmentary side view in the direction of arrow B of FIG. 1.

Referring now to FIGS. 1 and 2, a helicopter tail rotor, generally indicated at 10, comprises two diametrically opposed pairs of rotor blades 11 (one pair only being shown) arranged at right angles to each other for rotation in axially separated parallel planes about an axis 12.

The rotor blades 11 of each pair of blades are attached to the ends of strap members 13 comprising spaced-apart, generally parallel arms 13a, 13b, and 13c, 13d, respectively, which are flattened in a plane coincident with the plane of rotation of the rotor 10. The arms 13a, 13b, 13c and 13d are constructed of glass fibre-reinforced plastics material.

Metal fittings 14 provide for attachment of the rotor blades 11 to the respective strap members 13, the ends of arms 13a, 13b, and 13c, 13d, being located in jaw portions 26 formed on the fittings 14 and secured by bolts 15, thereby serving also to connect together adjacent ends of arms 13a, 13b, and 13c, 13d of the respective strap members 13. Outwardly facing jaw portions 27 formed on the fittings 14 provide attachment for the rotor blades 11.

It will be understood that this arrangement, although illustrated in respect of outer arms 13a and 13b only, is typical for the connection of inner arms 13c and 13d to the respective rotor blades.

The central region of each of the arms 13a, 13b and 13c, 13d of strap members 13 is bolted to diametrically opposed flanges 16 formed on a tubular rotor drive shaft 17 rotatable about the axis 12 by a transmission system (not shown) powered by the helicopter power source. Located concentrically within the rotor drive shaft 17 is a tubular rotor control shaft 18 that protrudes outwardly between the spaced-apart arms 13a, 13b and 13c, 13d of strap members 13 to an outer end supporting radially extending control arms 19 equal in number to the number of rotor blades 11. Outer ends of the arms 19 are connected through universal joints 20 to pitch control levers 21 formed integrally with the fittings 14.

The rotor control shaft 18 is movable axially by a rotor control system (not shown) so as to simultaneously vary the collective pitch setting of the rotor blades 11.

An inwardly protruding jaw portion 22 is formed integral with each fitting 14 so as to be located between the arms 13a and 13b and 13c and 13d of the strap members 13, the jaws of each portion 22 being located perpendicular to the plane of rotation of the rotor 10.

Opposed ends of a torsionally flexible steel tie bar 23 are located in the jaw portions 22 of diametrically opposed fittings 14, and are attached thereto by metal pins 24 fitted in apertures through the jaw portions 22. Each tie bar 23 extends across the axis of rotation 12, and is located centrally of arms 13a, 13b, and 13c, 13d, of respective strap members 13 and through axially extending slots 25 in the wall of the tubular control shaft 18.

The tie bars 23 therefore interconnect diametrically opposed fittings 14 to effectively interconnect opposed rotor blades 11, the ends of each tie bar 23 being free to pivot relative its respective attachment to fittings 14 in a plane perpendicular to the plane of rotation of the rotor 10. Thus, each tie bar 23 is supported only by the pivotal end attachments and is free of any other constraint throughout its length.

Referring now to FIG. 3, the arms 13c and 13d of inner strap member 13 are shown bolted to the flanges 16 formed on the rotor drive shaft 17. The associated tie-bar 23 is located through axially extending slots 28 provided through diametrically opposed lugs 29 extending from the drive shaft 17 and terminating in outer ends provided with further flanges 16 (one only being illustrated) for the attachment of arms 13a and 13b of outer strap member 13. For the sake of clarity, the rotor control shaft 18 has been omitted from FIG. 3.

Thus, the stagger between the inner and outer pairs of axially offset rotor blades in the illustrated four-bladed rotor is minimised.

In operation, rotation of the rotor drive shaft 17 is transmitted to the strap members 13 which, due to their flattened configuration, are sufficiently stiff in the plane of rotation to transmit torque to rotate the respective pairs of rotor blades 11 about the axis of rotation 12. Because the tensile elastic modulus of the steel tie bars 23 is substantially higher than that of the glass fibre-reinforced plastics strap members 13, the majority of the centrifugal load caused by each pair of rotating blades 11 is carried by the respective interconnecting tie bar 23, thereby relieving the strap member 13 of such loads.

The strap members 13 and tie bars 23 are flexible in torsion so that axial movement of the rotor control shaft 18 is transmitted through the control arms 19 to rotate the outer ends of the strap members 13 to simultaneously vary the pitch setting of all the rotor blades 11. Variations of the pitch setting of the rotor blades 11 will result, during operation, in blade flapping movements, i.e. movement of the blade 11 in a plane perpendicular to its plane of rotation, and in the so-called coning movement when each blade 11 of a respective pair flaps in the same direction and by the same amount, and such movements are permitted in the present invention by bending of the strap members 13.

During such bending movements of the strap 13, the associated tie bar 23 is free to move in a plane perpendicular to the plane of rotation of the rotor i.e., the blade flapping plane, so as to re-align itself for conditions imposed during blade flapping and coning movements. Such re-alignement is accomplished without bending of the tie bar 23 due to the tie bar 23 being supported only by its pivotal end attachments which permit relative pivotal movements in the plane perpendicular to the plane of rotation, and the arrangement of the axial slots 25 in the control shaft 18 through which the tie bars 23 are located.

Slight changes in relative dimensions of the strap members 13 and associated tie bars 23 during such flapping and coning movements are accommodated by the different tensile elastic modulus of the parts which ensures that, during such movements, the tie bars 23 bear the major portion of operational centrifugal loads.

Thus in the present rotor, the tie bars 23 cater for the majority of centrifugal loads, thereby off-loading the strap members 13 so that the strap members 13 can be designed to provide optimum properties in respect of relative stiffnesses in torsion and bending to enhance the operational characteristics of the rotor. The arrangement of the tie bar 23 in the present invention also effectively reduces the control forces required to change the blade pitch setting during the application of collective pitch owing to the reduction of centrifugal loads being carried by the associated strap member 13. Furthermore, since the tie bar 23 is supported only by its pivotal end attachments so as to be free of other constraints, a coupling of blade pitch and flap movements, which occur due to the restraint of the control system as the blades of a pair flap in opposite directions, will cause the ends of the tie bar 23 to be rotated in the same direction. This has an important effect on the working conditions of the tie bar 23 in that the tie bar 23 is relieved of cyclic twisting movements and is, therefore, subjected only to static twist during the application of collective pitch.

Whilst one particular embodiment has been described and illustrated it will be understood that many modifications can be made without departing from the scope of the invention as defined in the appended claims. For instance, the interconnecting strap members 13 may be formed integral with the respective pair of rotor blades especially in a rotor in which the blades themselves are constructed wholly or partially of fibre-reinforced plastics materials. Other suitable materials may be used in the construction of the strap members 13 and tie bars 23. The arms of each strap member 13 may be joined across their ends and may be manufactured as an integral assembly for location in a suitably modified fitting 14. The pitch control levers 21 may be separate from the fittings 14 and may be attached to their respective rotor blades 11 by any suitable means.

I claim as my invention:

1. A helicopter rotor comprising:
   a pair of diametrically opposed rotor blades arranged for rotation about an axis;
   a strap member interconnecting said opposed rotor blades, said strap member being flexible in torsion and in a plane perpendicular to the plane of rotation, said strap member further being substantially stiff in the plane of rotation; and
   a torsionally flexible tie-bar having a tensile elastic modulus greater than that of said strap member, said tie-bar being pivotally attached adjacent opposed ends of said strap member so as to permit relative pivotal movements of said tie-bar in a plane perpendicular to the plane of rotation and so as to bear the majority of the centrifugal load of said rotor blades.

2. A rotor as claimed in claim 1, wherein said strap member comprises two spaced-apart generally parallel arms located one on each side of said axis of rotation and in said plane of rotation.

3. A rotor as claimed in claim 2, wherein said spaced-apart arms are of flattened configuration in said plane of rotation.

4. A rotor as claimed in claim 2, wherein said tie-bar is located centrally within said spaced-apart arms of said strap member and extends through said axis of rotation.

5. A rotor as claimed in claim 4, wherein adjacent ends of said strap members are interconnected by a fitting having an integral inwardly facing jaw portion providing said pivotal attachment for the ends of the tie-bar.

6. A rotor as claimed in claim 5, wherein said fitting has an integral outwardly facing jaw portion adapted for attachment of said rotor blade.

7. A rotor as claimed in claim 2, wherein a central region of each of said spaced-apart arms is attached to diametrically opposed flanges formed on an axially extending tubular rotor drive shaft.

8. A rotor as claimed in claim 7, wherein an axially movable tubular rotor control shaft is located concentrically within said rotor drive shaft, and protrudes outwardly through said spaced-apart arms to an outer end supporting radially extending control arms equal in number to the number of rotor blades and operably associated therewith, said rotor control shaft having axially extending diametrically opposed slots for the passage of the tie-bar.

9. A rotor as claimed in claim 1, wherein said strap member is constructed of fibre reinforced plastics material.

10. A rotor as claimed in claim 1, wherein said tie-bar is constructed of steel.

* * * * *